(12) United States Patent
Boehler (10) Patent No.: US 12,081,644 B2
(45) Date of Patent: Sep. 3, 2024

(54) EFFICIENT DISTRIBUTED PRIVACY-PRESERVING COMPUTATIONS

(71) Applicant: SAP SE, Walldorf (DE)

(72) Inventor: Jonas Boehler, Karlsruhe (DE)

(73) Assignee: SAP SE, Walldorf (DE)

( * ) Notice: Subject to any disclaimer, the term of this patent is extended or adjusted under 35 U.S.C. 154(b) by 690 days.

(21) Appl. No.: 17/164,274

(22) Filed: Feb. 1, 2021

(65) Prior Publication Data
US 2022/0247548 A1 Aug. 4, 2022

(51) Int. Cl.
*H04L 9/00* (2022.01)

(52) U.S. Cl.
CPC .............. *H04L 9/002* (2013.01); *H04L 9/001* (2013.01); *H04L 2209/08* (2013.01); *H04L 2209/46* (2013.01)

(58) Field of Classification Search
CPC ..... H04L 9/002; H04L 9/001; H04L 2209/08; H04L 2209/46; H04L 9/008; G06N 20/00
See application file for complete search history.

(56) References Cited

U.S. PATENT DOCUMENTS

| | | | |
|---|---|---|---|
| 7,698,250 B2* | 4/2010 | Dwork | G06F 21/6245 702/180 |
| 10,459,763 B2* | 10/2019 | Buendgen | G06F 21/6245 |
| 10,536,437 B2* | 1/2020 | Bellala | H04L 67/12 |
| 10,565,524 B2* | 2/2020 | Bellala | G06N 20/00 |
| 10,572,679 B2* | 2/2020 | Frank | G06F 16/24578 |
| 10,795,999 B1* | 10/2020 | Gursoy | G06F 21/567 |
| 10,878,950 B1* | 12/2020 | Jun | G06Q 40/08 |
| 10,984,113 B1* | 4/2021 | Dhaliwal | H04L 63/14 |
| 11,062,215 B2* | 7/2021 | Laine | G06N 5/04 |
| 11,120,160 B2* | 9/2021 | Ying | G06F 21/602 |

(Continued)

FOREIGN PATENT DOCUMENTS

CN 115002173 A * 9/2022 ............. H04L 67/10

OTHER PUBLICATIONS

Goryczka et al., Secure Multiparty Aggregation with Differential Privacy: A Comparative Study, ACM, 2013.*

(Continued)

*Primary Examiner* — David Garcia Cervetti
(74) *Attorney, Agent, or Firm* — Mintz Levin Cohn Ferris Glovsky and Popeo, P.C.

(57) ABSTRACT

Aspects of the current subject matter are directed to performing privacy-preserving analytics over sensitive data without sharing plaintext data. According to an aspect, a system includes at least one data processor and at least one memory storing instructions which, when executed by the at least one data processor, result in operations including: receiving, from each of a plurality of clients, a utility score and a partial noise value; performing, based on the received utility scores and the partial noise values, a secure multi-party computation of a privacy-preserving statistic, the performing of the secure multi-party computation of the privacy-preserving statistic further comprising determining a noisy utility score for each data value in a domain of output values and selecting a highest noise utility score from the determined noisy utilities scores; and providing, based on the selected highest utility score, an output value for the privacy-preserving statistic.

15 Claims, 6 Drawing Sheets

(56) References Cited

U.S. PATENT DOCUMENTS

| | | | |
|---|---|---|---|
| 11,170,131 B1* | 11/2021 | Rogers | G06F 16/9035 |
| 11,205,011 B2* | 12/2021 | Jakobsson | G06F 21/6245 |
| 11,238,167 B2* | 2/2022 | Boehler | H04L 9/0894 |
| 11,290,266 B2* | 3/2022 | Li | H04L 9/085 |
| 11,290,267 B2* | 3/2022 | Li | H04L 9/0819 |
| 11,444,926 B1* | 9/2022 | Gama | G06N 5/04 |
| 11,531,782 B1* | 12/2022 | Poorebrahim Gilkalaye | H04L 9/085 |
| 11,582,203 B2* | 2/2023 | Storm | H04L 9/0625 |
| 11,631,117 B2* | 4/2023 | Schroepfer | H04L 9/0822 705/26.2 |
| 11,676,284 B2* | 6/2023 | Marrero | G06T 7/12 382/103 |
| 2007/0083493 A1* | 4/2007 | Dwork | G06F 21/6254 |
| 2007/0130147 A1* | 6/2007 | Dwork | G06F 21/6245 707/999.009 |
| 2007/0143289 A1* | 6/2007 | Dwork | G06F 16/2455 707/999.009 |
| 2008/0304657 A1* | 12/2008 | Tuyls | H04L 9/0869 380/28 |
| 2012/0143922 A1* | 6/2012 | Rane | G06F 21/6245 707/E17.005 |
| 2012/0204026 A1* | 8/2012 | Shi | H04L 9/3006 713/168 |
| 2014/0325230 A1* | 10/2014 | Sy | H04L 9/3231 713/171 |
| 2016/0004874 A1* | 1/2016 | Ioannidis | H04L 9/302 713/165 |
| 2016/0203333 A1* | 7/2016 | Fawaz | H04W 12/02 726/28 |
| 2018/0219842 A1* | 8/2018 | Bellala | H04L 67/12 |
| 2018/0268306 A1* | 9/2018 | Laine | G06N 5/01 |
| 2018/0349620 A1* | 12/2018 | Bhowmick | G06F 21/606 |
| 2019/0333607 A1* | 10/2019 | Pletea | G16B 20/00 |
| 2020/0021568 A1* | 1/2020 | Becher | H04L 9/083 |
| 2020/0034566 A1* | 1/2020 | Zhang | G06Q 50/01 |
| 2020/0042828 A1* | 2/2020 | Silberman | G06F 21/6218 |
| 2020/0104705 A1* | 4/2020 | Bhowmick | G06N 3/044 |
| 2020/0177364 A1* | 6/2020 | Zhou | G06N 20/00 |
| 2020/0228339 A1* | 7/2020 | Barham | H04L 9/0869 |
| 2020/0280430 A1* | 9/2020 | Tueno | H04L 9/008 |
| 2020/0382273 A1* | 12/2020 | Vald | G06N 5/01 |
| 2021/0165906 A1* | 6/2021 | Boehler | G06F 21/52 |
| 2021/0194874 A1* | 6/2021 | Herder, III | H04L 63/0861 |
| 2021/0350211 A1* | 11/2021 | Dalli | H04L 9/008 |
| 2021/0359846 A1* | 11/2021 | Wright | G06N 7/01 |
| 2022/0019441 A1* | 1/2022 | Rosing | G16B 30/10 |
| 2022/0057519 A1* | 2/2022 | Goldstein | G01S 17/88 |
| 2022/0083917 A1* | 3/2022 | Ben-Itzhak | G06N 20/20 |
| 2022/0108226 A1* | 4/2022 | Yu | G06N 5/04 |
| 2022/0114417 A1* | 4/2022 | Dalli | G06N 3/042 |
| 2022/0198254 A1* | 6/2022 | Dalli | G06N 3/065 |
| 2022/0215116 A1* | 7/2022 | Zhang | H04W 12/02 |
| 2022/0215126 A1* | 7/2022 | Almahmoud | G06F 21/602 |
| 2022/0247548 A1* | 8/2022 | Boehler | H04L 9/00 |
| 2022/0247551 A1* | 8/2022 | Joye | H04L 9/008 |
| 2022/0358241 A1* | 11/2022 | Palakodety | G16H 15/00 |
| 2022/0394102 A1* | 12/2022 | Wang | G06F 21/60 |
| 2022/0417003 A1* | 12/2022 | Giacomelli | H04L 9/085 |
| 2022/0417009 A1* | 12/2022 | Tran | H04L 9/008 |
| 2023/0017374 A1* | 1/2023 | Boehler | G06F 21/6245 |
| 2023/0205916 A1* | 6/2023 | Russo | G06F 21/6245 726/26 |
| 2023/0325370 A1* | 10/2023 | Sharma | G06F 21/6227 707/737 |
| 2023/0385270 A1* | 11/2023 | Hornsby | G06F 16/2365 |
| 2023/0409932 A1* | 12/2023 | Neumann | G06N 20/00 |

OTHER PUBLICATIONS

Pettai et al., Combining Differential Privacy and Secure Multiparty Computation, ACM, 2015.*

Jonas Bohler and Florian Kerschbaum, Secure Sublinear Time Differentially Private Median Computation, NDSS, 2020.*

Jonas Bohler and Florian Kerschbaum, Secure Multi-party Computation of Differentially Private Median, USENIX, Aug. 2020.*

Balcer, V. et al., "Separating local & shuffled differential privacy via histograms," arXiv:1911.06879v1, 2019.

Bittau, A. et al., "Prochlo: Strong privacy for analytics in the crowd," In Proceedings of the Symposium on Operating Systems Principles, SOSP, 2017.

Blocki, J. et al., "Differentially private password frequency lists," In Network and Distributed Systems Security Symposium, NDSS, 2016.

Boehler, J. et al., Secure multiparty computation of differentially private median. In 29th USENIX Security Symposium.

Cheu, A. et al., "Distributed differential privacy via shuffling," In Annual International Conference on the Theory and Applications of Cryptographic Techniques, EUROCRYPT, 2019.

Durfee, D. et al., "Practical differentially private top-k selection with pay-what-you-get composition," In Advances in Neural Information Processing Systems, pp. 3532-3542, 2019.

"Dwork, C. et al., "Calibrating noise to sensitivity in private data analysis," In Theory of Cryptography Conference, TCC, 2006.".

"Dwork, C. "Differential privacy," In International Colloquium on Automata, Languages, and Programming, ICALP, 2006.".

Dwork, C. et al., "The algorithmic foundations of differential privacy," Foundations and Trends in Theoretical Computer Science, 2014.

Goldreich, O. "Foundations of Cryptography: vol. 2, Basic Applications," 2009.

Hsu, J. et al., "Distributed private heavy hitters," In International Colloquium on Automata, Languages, and Programming, ICALP, 2012.

Kasiviswanathan, S.P. et al., What can we learn privately? SIAM Journal on Computing, 2011.

McGregor, A. et al., "The limits of two-party differential privacy," In Annual IEEE Symposium on Foundations of Computer Science, FOCS, 2010.

* cited by examiner

EFFICIENT DISTRIBUTED PRIVACY-PRESERVING COMPUTATIONS

FIELD

The present disclosure generally relates to secure data processing.

BACKGROUND

Services for performing analytics (e.g., statistics, aggregate queries, or the like) on sensitive data may involve sharing data with a third party. In some instances, it may not be desirable or feasible for one or more parties sharing data to share plaintext data. For example, the data may be sensitive data that is not permitted to be shared. In some instances, the parties sharing the data may be mutually distrusting parties. In other instances, use of a trusted third party may not be feasible as the trusted third party may become compromised.

SUMMARY

Methods, systems, and articles of manufacture, including computer program products, are provided for secure multi-party computations.

According to an aspect, a system includes at least one data processor and at least one memory storing instructions which, when executed by the at least one data processor, result in operations including: receiving, from each of a plurality of clients, a utility score and a partial noise value; performing, based on the received utility scores and the partial noise values, a secure multi-party computation of a privacy-preserving statistic, the performing of the secure multi-party computation of the privacy-preserving statistic further comprising determining a noisy utility score for each data value in a domain of output values and selecting a highest noise utility score from the determined noisy utilities scores; and providing, based on the selected highest utility score, an output value for the privacy-preserving statistic.

In some variations, one or more of the features disclosed herein including the following features can optionally be included in any feasible combination. The noisy utility score may be determined by summing, for each of the data values, the utility scores and the partial noise. The partial noise may be determined based on an exponential distribution. The partial noise may be determined based on a Gumbel distribution. A utility function, at each of the plurality of client, may determine the utility score. The received utility scores and the received partial noise values may be encrypted.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

Like labels are used to refer to same or similar items in the drawings.

DETAILED DESCRIPTION

Data collection is a primary function of many entities around the globe. For example, some entities offer a free service, such as Internet searching or a social network, and then monetize data collection of end-user data from those free services. However, unrestricted, general data collection that allows uniquely identifying the identity of an end-user may cause ethical and/or legal concerns under the data protection regulations of certain jurisdictions, such as General Data Protection Regulations (GDPR). Specialized, privacy-preserving data collection may alleviate some of these data collection-related privacy concerns. For this reason, differential privacy (DP) may be used to provide a strong privacy guarantee. Moreover, secure, multi-party computation (MPC) may be used in combination with differential privacy. The additional use of secure multi-party computation may improve accuracy, without reducing privacy. Secure multi-party computation is a cryptographic tool that allows multiple parties to evaluate a function on data distributed among the parties but only the function's result is revealed or shared among the parties (in other words, the input data is not shared among the parties). However, secure computation of a differential privacy mechanism may be considered generally less efficient, with potentially high communication and computation overhead.

In some example embodiments, there is provided an efficient process for secure computation of differential privacy mechanisms that can provide more efficient implementations that improve run time and communication demands, when compared to past approaches.

In some example embodiments, there is provided an exponential mechanism (EM). The exponential mechanism computes selection probabilities for potential outputs of a function, such as a statistical function or other type of function. The exponential mechanism may be considered universal in the sense that the exponential mechanism may implement any differential privacy mechanism. However, the exponential mechanism (EM) may require many evaluations of the exponential function, which may be prohibitively expensive in secure computations. In some example embodiments, the exponential mechanism may be implemented such that it provides noise from a distribution, such as a Gumbel distribution, exponential distribution, and/or the like. For example, each of the client devices may provide partial noise terms, and then the partial noise terms are securely combined to provide the required aggregate noise.

The combination of MPC and DP may be combined with functions, such as functions that can be decomposed (e.g., decomposable functions as further described below) and that can be applied to rank-based statistics, such as a $p^{th}$ percentile, interquartile range, a median, a mode, and other types of rank-based statistics. To illustrate, the median (which represents a "middle" value of a data set) may be used to identify or represent a typical value from a data set. When a query of a database includes an operation to determine a median of a data set, in a multiparty environment, a party (associated with a client device) may want to compare a key performance value with other parties using the median as the basis for the comparison in the context of enterprise benchmarking (e.g., to compare a company with competitors to find room for improvement by detecting inefficient processes). In this example, each party's data set may be structured so each data set can be queried in a confidential and/or a private manner in accordance with MPC and DP, so that the parties do not share their data sets. In this example, each party (via a client device) may execute a secure, multi-party computation to determine a differentially private median (in a privacy-preserving and secure manner). And, each party may receive a response indicative of the median of the combined data set of all the parties, even though the parties did not reveal or share their own data to the other parties. In this example, the MPC including the EM (which is realized with noise from a distribution, such as a Gumbel distribution, exponential distribution) provides input secrecy (e.g., providing input data privacy, so that no one learns somebody else's sensitive input) and output privacy (e.g., providing privacy with respect to the output so that, instead of outputting an exact value that can be used to infer something about an input, the returned output is somewhat randomized).

Although the previous example described an example of a secure multiparty computation function in the form of the median, other types of operations or functions may be implemented as well.

The combination of MPC and DP disclosed herein may allow sharing enterprise data without violating the privacy of any individual or entity contained in the data sets. Privacy-preserving computation may help to gather information not only from a single party (or end-user's) system but from a variety of parties, while providing strong privacy and security guarantees. For example, combining such partial information from parties can enable holistic insights for an entire enterprise or sector of enterprises, and inefficiencies may be detected across a larger group of parties (or companies, for example) in a secure and private matter (without each company sharing its entire data set with others). For example, a plurality of hospitals may compare mortality rates of diseases (e.g., heart attack, etc.) among the hospitals, without each hospital sharing its data with the other hospitals; thus keeping specific patient data private.

In some of the examples disclosed herein, a party may refer to a client machine (or device), such as a computer, IoT device, and/or other processor-based machine. Given for example, a set of quantity of n parties, this can be represented as follows:

$$\mathcal{P} = \{P_1, \ldots, P_n\},$$

where each party $P_i$ holds at least at least a single data value $d_i$, where i varies from 1 to n, and D denotes the combined data set of the parties, $\mathcal{P}$. The combined data set may be modelled as $D=\{d_1, \ldots, d_n\}$, wherein $d_1, d_2, d_n$ are data values (or more simply "data") of the data domain U (e.g., a data universe U representing a set of potential data values, such as a set of all integers, a set of integers, and a like).

Secure multi-party computation may enable the set of parties, $\mathcal{P} = \{P_1, \ldots, P_n\}$ to jointly compute a function, such as a median, mode, or other type of function or operation, without each party sharing their data set with the other parties. Given for example each party $P_i$ holds sensitive input data $d_i$, the set of parties may jointly compute a function $y=f(d_1, \ldots, d_n)$, while maintaining the privacy of the inputs $d_1, \ldots, d_n$. The output of the secure multi-party computation must be correct and secret; in other words, the correct value of the output y must be computed and the secrecy of the input data $d_1, \ldots, d_n$ is preserved among the parties, so only the output is revealed to the parties.

Secure multi-party computation may be implemented using different trust assumption models. In a semi-honest model (or passive), the parties (also referred to as adversaries) do not deviate from the protocol but gather everything created during the run of the protocol. However, in the malicious model (or active), the parties can deviate from the protocol (e.g., alter messages). In the following examples, the semi-honest model is described to facilitate explanation, although other trust assumption models including the malicious model may be followed as well.

Differential privacy (DP) provides, as noted, strong privacy guarantees by restricting what can be provided as an output. When a single data value of the input data set changes for example, the effect on the output may be restricted or bounded, so that privacy is maintained. If an algorithm is differentially private, an observer seeing the algorithm's output would not be able to discern an input data value used to compute the output. Some form of randomization is an essential aspect for differential privacy to hide and maintain the privacy of a party's input data. In a mathematical or formal sense, differential privacy may be defined as shown in Table 1 below, although less formal definitions of differential privacy may satisfy the input data privacy required of differential privacy. Although the definition provided at Table 1 holds against an unbounded adversary; in the case of cryptography however, the definition may also hold for a computationally bounded adversary as well.

TABLE 1

Definition 1 (Differential Privacy): A mechanism $\mathcal{M}$ satisfies $\epsilon$-differential privacy, where $\epsilon \geq 0$, if for all neighboring data sets $D \simeq D'$, i.e., data sets differing in a single entry, and all sets $S \subseteq \text{Range}(\mathcal{M})$
$\Pr[\mathcal{M}(D) \in S] \leq \exp(\epsilon) \cdot \Pr[\mathcal{M}(D') \in S]$,
where $\text{Range}(\mathcal{M})$ denotes the set of all possible outputs of mechanism $\mathcal{M}$.

To provide differential privacy for numerical data, noise may be added directly to the output of a function, such as a statistical function or other type of function. To that end, an exponential mechanism (EM) may be used to expand the application of differential privacy to arbitrary functions (e.g., those functions that provide a numerical output and a non-numerical output). The exponential mechanism may be used to compute selection probabilities for a set of possible outputs, one of which is sampled as an output based on these selection probabilities. The exponential mechanism is exponentially more likely to select "good" output results, wherein "good" is quantified via a utility function u(D, r)

that takes, as input, a data set D that is an element of the data domain U, and provides a potential output r that is an element of $\mathcal{R}$ from a fixed set of arbitrary outputs $\mathcal{R}$. For example, the utility function may provide a score, such that a higher utility score may indicate the output is more desirable, and its selection probability is increased, when compared to another output with a lower utility score. In other words, rather than provide the exact output of the function being computed via the secure MPC, the exponential mechanism provides differential privacy by selecting other results based on their selection probability.

Figure 1A:
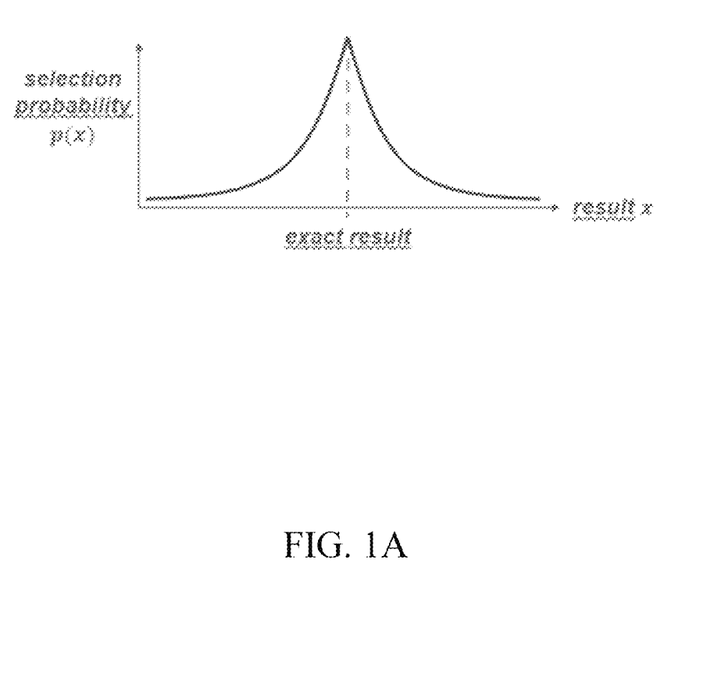
FIG. 1A shows conceptually the exponential mechanism and, in particular, computing selection probabilities for possible results and selecting an output based on the selection probabilities, in accordance with some example embodiments.

FIG. 1A depicts an example of the selection probabilities computed by the exponential mechanism, in accordance with some example embodiments. In a mathematical or formal sense, the exponential mechanism can be defined as shown in Table 2 below, although less formal definitions of the exponential function may be use as well. In the examples described herein, the exponential mechanism (EM) is denoted as $EM_u^\varepsilon(D)$ (although in some of the examples described herein, the u and/or ε notations may not be included in the does not include the $EM_u^\varepsilon(D)$ shown below in Table 2. At Table 2, "$\mathcal{R}$" refers to the set of potential output values.

TABLE 2

Definition 2 (Exponential Mechanism). For any utility function u: $(U^n \times \mathcal{R}) \to \mathbb{R}$ and a privacy parameter ε, the exponential mechanism $EM_u^\varepsilon(D)$ outputs $r \in \mathcal{R}$ with probability proportional to exp $\left(\dfrac{\varepsilon u(D, r)}{2\Delta u}\right)$, where $\Delta u = \max\limits_{\forall r \in \mathcal{R}, D \simeq D'} |u(D, r) - u(D', r)|$ is the sensitivity of the utility function. That is, $$Pr[EM_u^\varepsilon(D) = r] = \dfrac{\exp\left(\dfrac{\varepsilon u(D, r)}{2\Delta u}\right)}{\sum_{r' \in \mathcal{R}} \exp\left(\dfrac{\varepsilon u(D, r')}{2\Delta u}\right)}. \quad (1)$$

Figure 1B:
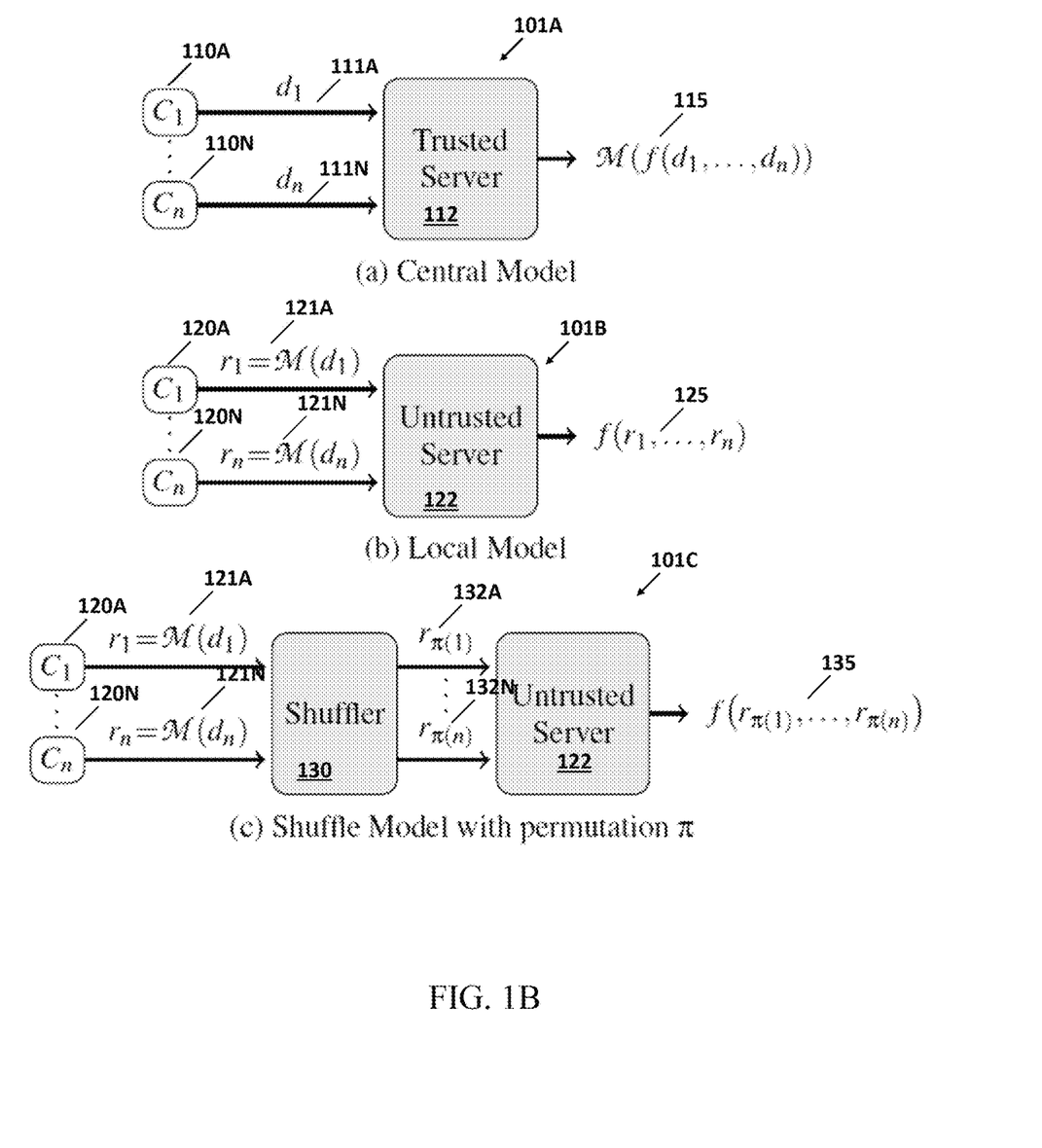
FIG. 1B depicts examples of the models in which differential privacy algorithms may be implemented, in accordance with some example embodiments.

FIG. 1B depicts examples of differential privacy algorithms M implemented in accordance with different models, such as a central model 101A, a local model 101B, and a shuffle model 101C. In the central model 101A, each of the parties 110A and 110N (depicted as client devices "$C_1$" ... "$C_N$") send their unprotected data to a trusted, central server 112, which runs the differential privacy algorithm $\mathcal{M}$ on the clear data. The central model may provide the highest accuracy as the randomization inherent to differential privacy algorithms is only applied once at the trusted central server 112. In the example of FIG. 1B, the differential privacy algorithm $\mathcal{M}$ combines a function (e.g., to compute a median, a mode, a count, or other function or operator to be calculated via the MPC) with a randomization process. In this example, $\mathcal{M}$ is a differential privacy mechanism that computes utility scores for the function (which is being computed via MPC) and probabilistically selects outputs based on the computed utility scores, where higher scores can translate to higher selection probability.

In the local model 101B, each of the parties 120A and 120N (depicted as client devices "$C_1$" ... "$C_N$") locally apply the differential privacy algorithm $\mathcal{M}$ and then send anonymized values 121A-121B to an untrusted server 122 for aggregation. In the case of the local model 101B, the accuracy of the output 125 may be limited as the randomization is applied multiple times. Hence, the local model 101B may require a relatively large number of users to achieve accuracy comparable to the central model.

In the case of the intermediate shuffle model 101C, a shuffler 130, which is a trusted party added between the parties 120A-N and the server 122. The shuffler does not collude with any of the parties 120A-N. The shuffler permutes and forwards the randomized client values 132A-B. The permutation breaks the mapping between a client and her value, which reduces randomization requirements. The accuracy of the shuffle model 101C may be between the accuracy of the local model 101A and the central model 101B; but in general, the shuffle model 101C is strictly weaker than the central model 101B. The centralized MPC model 101A may generally incur a high computation burden and communication overhead (which reduces efficiency and scalability to larger quantities of clients/parties). The centralized MPC model 101A may provide some of the benefits over the other models, such as higher accuracy and stronger privacy (e.g., no disclosure of values to a third party).

In some example embodiments, there is provided a protocol for the exponential mechanism (EM) that can be efficiently realized within a secure multi-party computation. The exponential mechanism may provide differential privacy by providing in a sense noise to the output of the function being determined via the secure MPC. Moreover, variations of the exponential mechanism (EM), such as the EM_Exp and EM_Gumbel mechanisms, can be used to provide an efficient implementation for the EM in a distributed setting with high accuracy (e.g., by replacing a trusted third party with cryptographic, secure MPC).

The secure MPC may be used to compute selection probabilities of the possible outputs and then to sample the output based on these probabilities. In some example embodiments, there is provided alternative implementations to the exponential mechanism (EM). In some example embodiments, these alternative exponential mechanisms (1) add noise to a utility score of each possible output and then (2) select the output with the highest noisy utility score (e.g., the so-called "arg max" over the noisy utility scores).

The alternative approach may include an exponential mechanism that adds noise, which may be represented as follows:

EM_Exp selects $\underset{r \in \mathcal{R}}{\operatorname{argmax}}\{u(D, r) + \text{Exponential}(2\Delta u/\varepsilon)\}$, where u(D,r) denotes the utility function, Exponential(b) denotes a random variable from the exponential distribution with scale b and density as follows:

$\text{Exponential}(x; b) = \dfrac{1}{b}\exp\left(-\dfrac{x}{b}\right)$ for x>0 and 0 elsewhere.

Another example of an alternative approach may be represented as follows:

EM_Gumbel selects $$\underset{r \in \mathcal{R}}{\mathrm{argmax}}\{u(D, r) + Gumbel(2\Delta u/\varepsilon)\},$$

where u(D,r) denotes the utility function, and the Gumbel(b) denotes a random variable from the Gumbel distribution with scale b and density as follows:

$$Gumbel(x; b) = \frac{1}{b}\exp\left(-\left(\frac{x}{b} + \exp\left(\frac{x}{b}\right)\right)\right).$$

The exponential mechanism may require many evaluations of the exponential function exponential function, which can be computationally expensive, especially for secure computation. The alternative approaches, such as the EM_Exp and EM_Gumbel mechanisms, are less computationally burdensome as the alternatives require mostly addition (and comparisons), which can be more efficiently implemented in secure computation, when compared to an exponential distribution that relies on selection probabilities.

To further improve computational efficiency, decomposable utility functions may be used as they may be efficiently evaluated over distributed data via addition. The utility functions are "decomposable" in the sense that the utility function can be decomposed and distributed among the parties for calculation of the function being calculated via MPC. In a mathematical or formal sense, the decomposability of a utility function may be defined as shown in Table 3 below, although a less formal definition may be used for decomposability as well.

TABLE 3

Definition 3 (Decomposability). We call a function u: $(U^n \times \mathcal{R}) \to \mathbb{R}$ decomposable w.r.t. function u': $(U^n \times \mathcal{R}) \to \mathbb{R}$ if $u(D, r)$ $\Sigma_{i=1}^n(d_i, r)$ for $x \in R$ and $D = \{d_1, \dots, d_n\}$.

For decomposability, each party $P_i$ may compute a local utility score $u'(d_i, r)$ with their data value $d_i$, and these local utility scores may be summed to form a global utility score over the entire data set D. For example, a count operation of the data sets is decomposable to each of the parties, so the utility function for the count can be expressed with sums. Example applications are convex optimization for machine learning (e.g., sum of loss function evaluations per datum), unlimited supply auction (e.g., sum of goods each bidder is willing to buy for a given price) and frequency-based statistics (e.g., sum of frequency per datum). Additionally, one can consider solutions that reduce the size of $\mathcal{R}$ (e.g., the number of possible output elements one has to compute a utility score by using divide-and-conquer techniques or dynamic programming).

It may be considered inefficient to directly compute the additive noise for the alternative exponential mechanisms, such as the EM_Exp and EM_Gumbel mechanisms, with secure multi-party computation. To securely generate the noise, each of the parties may need to securely evaluate the exponential function (or similarly expensive functions). This complexity may be reduced or avoided to achieve an efficient secure computation. For example, the noise may be determined indirectly, by letting each party compute a portion (or part) of the noise, which may then be combine securely into the aggregate (or whole) noise. This is possible for distributions that are infinitely divisible, such as a distribution that can be expressed as the sum of independent and identically distributed random variables. The exponential distribution (used in EM_Exp) and the Gumbel distribution (used in the EM_Gumbel) are both infinitely divisible. Thus, partial noise values may be summed together to compute the required noise with secure computation. In some of the following examples, there is described a formal expression for the infinite divisibility of the EM_Exp and EM_Gumbel mechanisms. Moreover, X~Z(b) denotes that a random variable X is drawn from a distribution Z(b) with scale b, and set b=2Δu/ε (as required for EM_Exp and EM_Gumbel).

In the case of partial noise for the EM_Exp, the $$X \sim Exponential\left(\frac{2\Delta u}{\varepsilon}\right),$$

as used by EM_Exp, can be expressed as follows:

$$\sum_{j=1}^n N_j, N_j \sim Gamma\left(\frac{1}{n}, \frac{2\Delta u}{\varepsilon}\right)$$

where the Gamma distribution has density as follows:

$$Gamma(x; k, b) = \frac{x^{k-1}}{\Gamma(k)b^k}\exp(-x/b)$$

with gamma function Γ(□) using parameterization with shape parameter k and scale parameter b.

In the case of partial noise for the Exponential Mechanism based on the Gumbel distribution (EM_Gumbel), the $$X \sim Gumbel\left(\frac{2\Delta u}{\varepsilon}\right)$$

as used by EM_Gumbel can be expressed as follows:

$$\frac{2\Delta u}{\varepsilon}\left(\lim_{n \to \infty}\left\{\sum_{j=1}^n \frac{Y_j}{j} - \log(n)\right\}\right), Y_j \sim Exponential(1).$$

Figure 2:
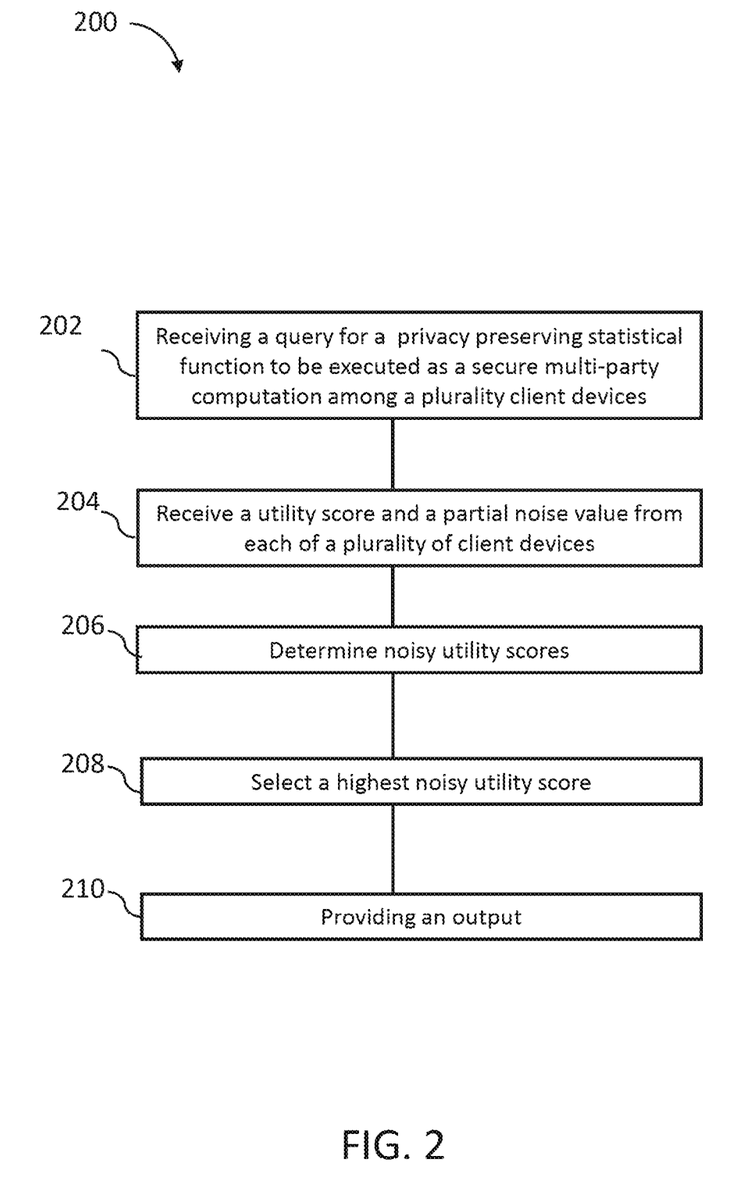
FIG. 2 depicts an example of a secure multi-party computation (MPC) mechanism including an exponential mechanism, in accordance with some example embodiments.

FIG. 2 depicts an example of a process 200, in accordance with some example embodiments.

At 202, a query for a privacy preserving statistical function, such as mode, median, or other type of function, may be received for execution as a secure multi-party computation among a plurality client devices. For example, when a query for the privacy preserving statistical function, this may trigger 204.

At 204, utility scores and partial noise values may be received from each of the parties, in accordance with some example embodiments. For example, each of the parties 110A-N may determine their corresponding utility scores and partial noise. The utility scores and partial noise (which are determined by each of the parties 110A-B) may then be provided to, for example, a server. In some embodiments, the parties may each encrypt the utilities score and/or partial noise sent to the server 112.

At 206, a noisy utility score may be determined for each of the data values in a domain of output values. For example, a server may, as part of the MPC, determine the noisy utility scores. Table 4 below depicts an example algorithm for calculating the noisy utility scores. The noisy utility score may be determined based on the utility scores and partial noise provided by each of the parties. For example, for each data value r that is an element in the data set, a noisy utility score is computed, by the server, for r as follows:

$$s = u(r, D) + \sum_{i=1}^{n} N_i^j$$

wherein is used to loop through the output set so j goes from 1 to the size of the output set (denoted $\mathcal{R}$), i.e., each party i provides a partial noise value $N_i^j$ for the j-th output element. If s greater than m, m is set equal to s (which is the current maximum score) and v is set equal to r (which is the output with the currently highest score).

At 208, a highest noisy utility score may be selected from the determined noisy utility scores. For example, a server may, as part of the MPC, determine the highest noisy utility score. Table 4 below also depicts selecting the highest noisy utility score.

At 210, the data value corresponding to the highest utility score is then output as a response to the query. For example, an output, v, may be provided in a secure multi-party computation while maintaining the privacy of the input data. The server may provide an output, v, which may be shared among the parties without sharing data among the parties and while preserving the differential privacy of the input data.

TABLE 4

Input: List of utility scores $\{u(r, D)\}_{r \in \mathcal{R}}$ and partial noises $\{N_i^j\}_{j=1}^{|\mathcal{R}|}$ from each party $P_i$.
1. Initialize m = 0, j = 1 and v = ∅
2. For each r ∈ $\mathcal{R}$:
   (a) compute noisy utility score for r as $$s = u(r, D) + \sum_{i=1}^{n} N_i^j$$

and set j = j + 1
   (b) if s > m then set m = s (current maximum score) and v = r (output with currently highest score)|
Output: v The example process depicted at FIG. 2 and at Table 4 may provide secure computation with high accuracy (when compared to a local model) and may provide strong privacy (when compared to the central model). To that end, the process depicted at FIG. 2 and at Table 4 may use simple computations (mainly addition and comparison) which can be more efficiently realized with secure computation. Furthermore, the process depicted at FIG. 2 and at Table 4 may be implemented using integers (with a scaling factor, for example). Secure computation with integers is more efficient compared to floats, which are required for implementations using the exponential function.

Assume a quantity of n parties with at least one datum di. In this example, the parties want to compute a differentially private mechanism over their combined data D= {d1, . . . . ,dn}. The desired mechanism is described by the utility function u that scores each possible output. It is assumed in some of the following examples that the utility function has been already securely evaluated on all outputs, and that the utility function is required as an input to the process depicted at FIG. 2 and at Table 4. For decomposable utility functions, the parties may perform an efficient, secure summation protocol and for very large output domains $\mathcal{R}$ (which correspond to large input to our protocol).

To illustrate further, the output may have an output domain of possible output values of $\mathcal{R}$ ={1, 2, 3, 4, 5}, which includes the domain of all possible output values. Let the data domain U correspond to all values that can appear in the data (which may be the same as the output domain $\mathcal{R}$). In the example of process 200 and Table 4, the utility scores may be pre-computed. For the following examples, the decomposable utility functions are used to show how the scores for each party's data can be combined into a score over their joint data. To simplify the explanation of the examples below, the noise or partial noise (which randomize the results) is omitted.

Figure 3A:
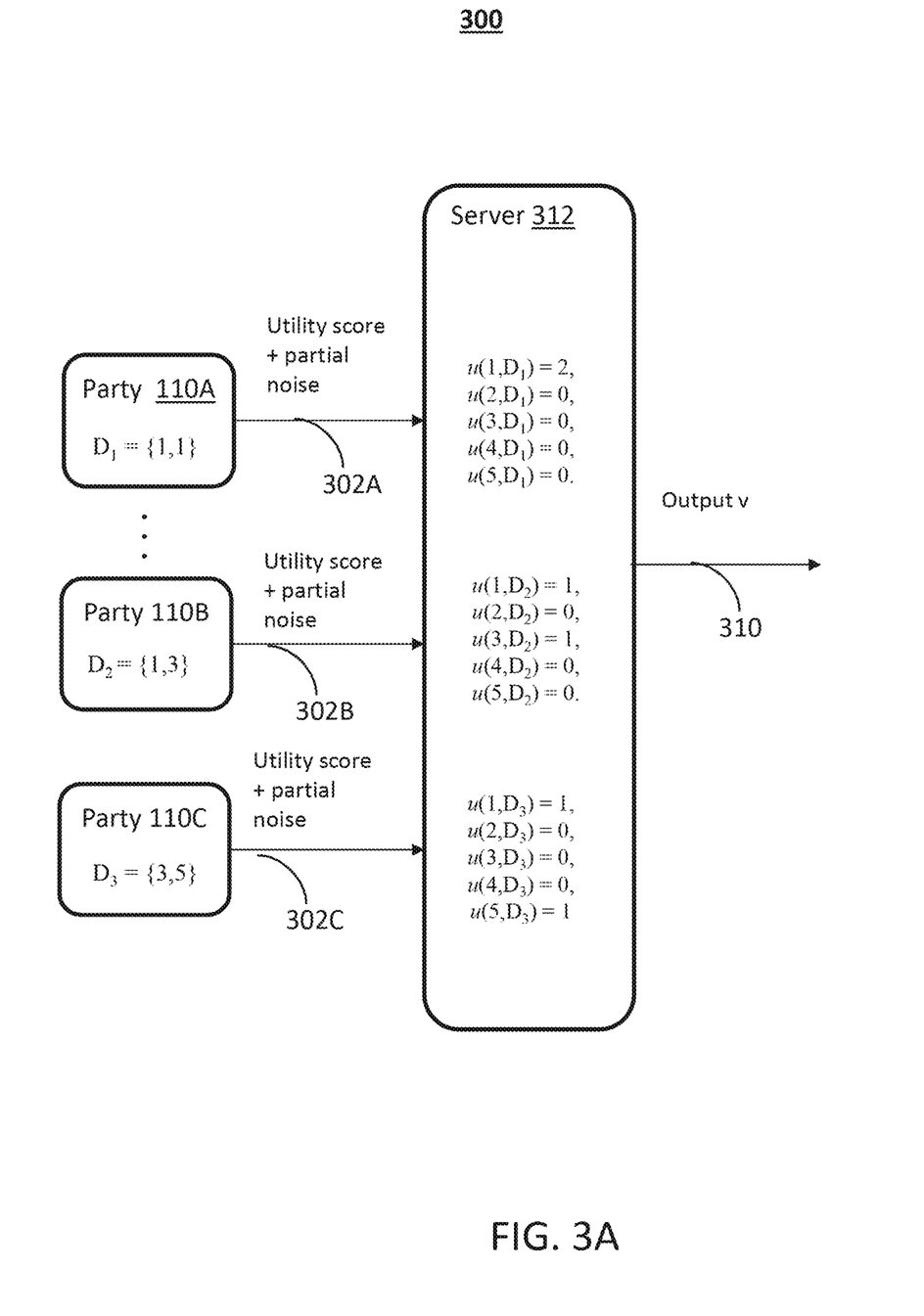
FIG. 3A and FIG. 3B depict examples of a system configured to provide secure multi-party computations, in accordance with some example embodiments.
Figure 3B:
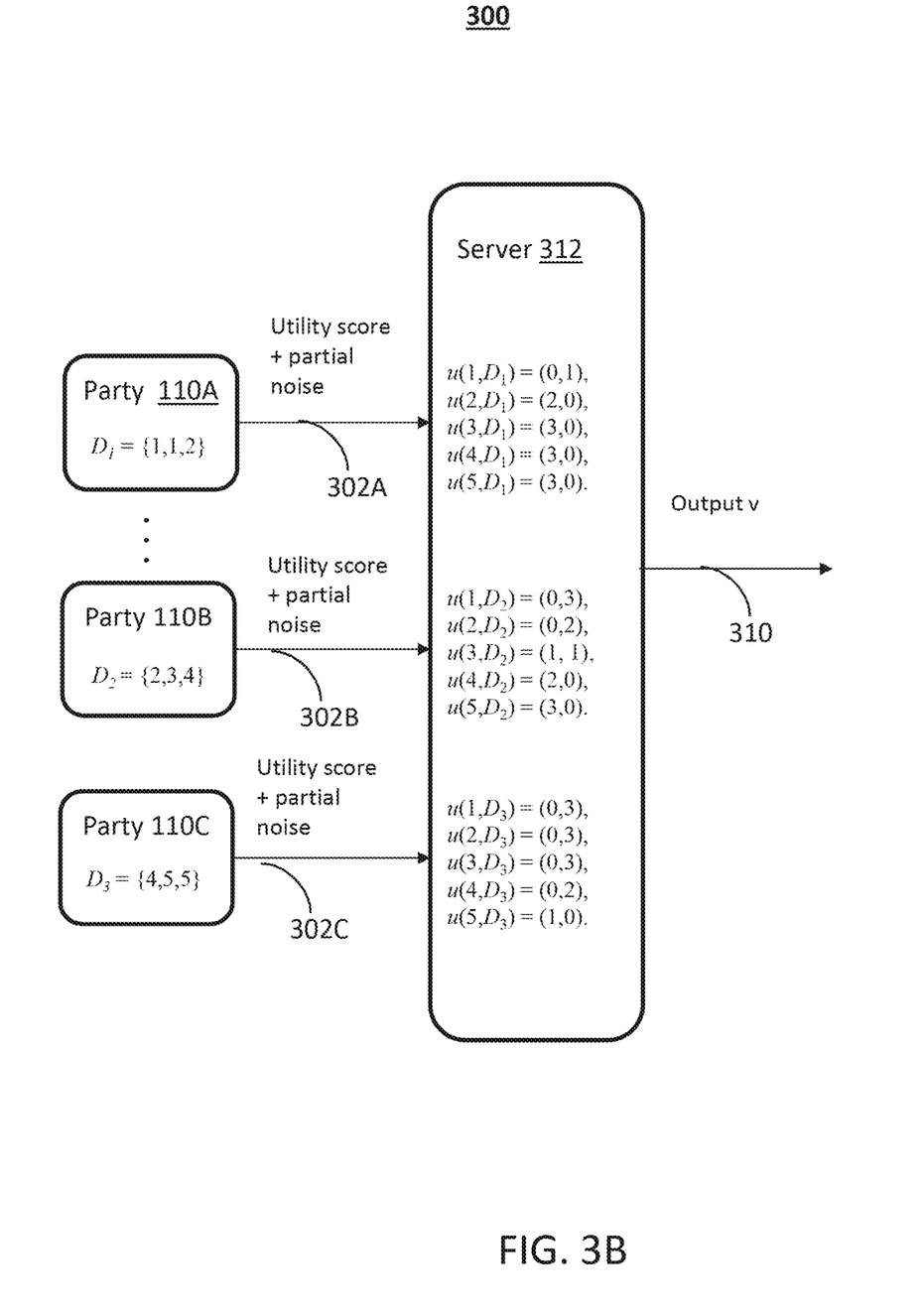

In some example embodiments, a query is received to determine an operation such as a statistical function for the "mode" among the joint data sets of parties 110A, 110B, and 110C, and this mode may be determined based on a secure multi-party computation and an exponential mechanism as disclosed herein. FIGS. 3A-B depict simple examples of the secure MPC computation of the mode (FIG. 3A) and median (FIG. 3B) for purposes of explanation as other types of functions including statistical functions may be determined as well using secure MPC including the EM_Exp and EM_Gumbel mechanisms.

Referring to FIG. 3A, the system 300 includes parties 110A-110C. As noted, the "mode" refers to a function or operation that determines a data value that appears most frequently in the input data set of the parties 110A-C. In this example, there are three parties $P_1$ 110A, $P_2$ 110B, and $P_3$ 110C, each of which has its own data set as follows:

$P_1$ has data $D_1$={1,1}, $P_2$ has data $D_2$={1,3}, $P_3$ has data $D_3$={3,5}.

In this example, the joint data of all three parties is D={1,1,1,3,3,5}, but each party does not have access to the joint data D as each party only has access to its data. As such, the parties may determine the mode in a secure and private multi-party secure computation, without sharing their respective data set with the other parties. In other words, $P_1$ 110A wants to answer the query of what is the "mode" among the joint data set D of all of the parties without sharing its data set $D_1$ with parties $P_2$ 110B, and $P_3$ 110C. Likewise, parties $P_2$ 110B and $P_3$ 110C may want to know the mode, without sharing their data sets $D_2$ and $D_3$. To perform the secure multi-party computation of the mode based on the exponential mechanism disclosed herein, each party determines the utility score of a data value r, which in this example is the mode (or frequency) of r in each of the party's data sets.

The server 312 may receive, from each of the parties $P_1$ 110A, $P_2$ 110B, and $P_3$ 110C, a utility score, in accordance with some example embodiments. For example, each of the parties $P_1$ 110A, $P_2$ 110B, and $P_3$ 110C may provide a utility scores with partial noise values. To illustrate further, the party $P_1$ 110A may provide an input 302A to the server 312. For the mode, the input 302A corresponds to utility scores for each data value in the data set $D_1$, so in the instant example the list of utility scores, u, are as follows:

u(1,$D_1$)=2, u(2,$D_1$)=0, u(3,$D_1$)=0, u(4,$D_1$)=0, u(5,$D_1$)=0.

Thus, the utility score represents a function decomposed to each of the parties. As such, in the example of the mode, the utility score can be decomposed to each party so that each party provides the mode of each of the possible output values "r" in the local data set of each party (in this example, "r" can vary from "1" to "5" as part of the output domain $\mathcal{R}$). Moreover, the party $P_1$ 110A may provide to the server 312 a partial noise value. For example, each party would provide a partial noise value for each possible output value/element (so each element/value has its own score). The partial noise disclosed herein may be added to the utility score based on the noted exponential mechanisms, EM_Exp and EM_Gumbel.

The party $P_2$ 110B may provide an input 302B to the server 312. This input 302B corresponds to utility scores for each data value in the data set $D_2$, so in the instant example the list of utility scores, u, are as follows:

u(1,$D_2$)=1, u(2,$D_2$)=0, u(3,$D_2$)=1, u(4,$D_2$)=0, u(5,$D_2$)=0.

And, the party $P_2$ 110A may provide to the server 312 a partial noise value.

The party $P_3$ 110C may provide an input 302C to the server 312. This input 302C corresponds to utility scores for each data value in the data set $D_2$, so in the instant example the list of utility scores, u, are as follows:

u(1,$D_3$)=1, u(2,$D_3$)=0, u(3,$D_3$)=0, u(4,$D_3$)=0, u(5,$D_3$)=1

Moreover, the party $P_3$ 110C may provide to the server 312 a partial noise value. As noted, the parties $P_1$ 110A, $P_2$ 110B, and $P_3$ 110C may also provide inputs that include partial noises for each of the utility scores, but the partial noise is omitted from the description of the example to facilitate explanation.

In response to receiving the noisy utility scores 302A-C, the server 312 (or other type of computer-based processor) may determine and select a highest noisy utility score, wherein the output value having the highest noisy utility score is selected from a domain of output values.

For example, the algorithm of Table 4 is used to determine the highest utility score leading to the selection of the output value. In the example of Table 4, one or more variables used in the computation may be initialized. For example, the variable m (which denotes a current iteration's highest utility score) is initialized to zero; the variable v (which denotes the output element with the highest score) is set to zero (0); the variable j (which as noted above with respect to Table 4) is an index or loop variable.

For each data value r (which in this example can vary from "1" to "5" as part of the output domain $\mathcal{R}$ of the domain) a noisy utility score, s, is computed for r. In some example embodiments, the noisy utility score is computed as follows (as noted at Table 4 above):

$$s = u(r, D) + \sum_{i=1}^{n} N_i^j$$

wherein u(D, r) denotes the utility function, and $N_i^j$ denotes the partial noise.

This noted equation for the noisy utility score s loops through all possible data values of r. The utility score (for decomposable utility function of the mode, for example) is the sum of all utility scores per party for a given value r. In the case of the noisy utility score, it is the sum of all utility scores for a value r plus the partial noises $N_i^j$.

Returning to our numerical example, for r=1, the server 312 computes the utility score s as follows:

$$s = u(1, D)$$
$$= u(1, D_1) + u(1, D_2) + u(1, D_3)$$
$$= 2 + 1 + 1 = 4.$$

For r=2, the server 312 computes the utility score s as follows:

s=0+0+0=0.

For r=2, the server 312 computes the utility score s as follows:

s=0+1+1=2.

For r=4, the server 312 computes the utility score s as follows:

s=0+0+0=0.

And, for r=5, the server 312 compute the utility score s as follows:

s=0+0+1=1.

The variables m and v track the currently highest utility score s and corresponding element r. In this example, after the looping, the highest utility core of 4 is determined and selected, so the value that corresponds to this highest utility score is r=1. Thus, the server 312 may provide, at 310, an output v that is equal to the value "1" (which in this example corresponds to the "mode" of "1" determined securely and in a private manner). Thus, the server used the noisy utility scores to select an output value from the output data domain $\mathcal{R}$ (which in this example is the set of values {1,2,3,4,5}). The output v is probabilistic (but it is exponentially more likely to release the actual mode, instead of other elements that appear less frequently).

To illustrate further by way of another example, the following describes an example of a query received to determine a "median" among the joint data sets of parties 110A, 110B, and 110C, and this median may be determined based on a secure multi-party computation and an exponential mechanism, such as the EM_Exp and EM_Gumbel mechanisms. The median represents a function or operation that determines a middle value of a sorted list of values. In this example, the domains and parties are the same as in the mode example above described with respect to FIG. 3A. FIG. 3B depicts the system of FIG. 3A configured for the median secure multi-party computation, although as noted the use of the "median" is for purposes of illustration as other functions including statistical functions may be implemented as well. The data sets of the parties $P_1$ 110A, $P_2$ 110B, and $P_3$ 110C are as follows:

$P_1$ has $D_1=\{1,1,2\}$, $P_2$ has $D_2=\{2,3,4\}$, $P_3$ has $D_3=\{4,5,5\}$, so the joint, combined data comprises the set of $D=\{1,1,2,2,3,4,4,5,5\}$, although this joint set is not shared as each party keeps its own data and does not share with the other parties. As noted, the median is the element that splits the sorted data roughly in half, which in this example the median of D is 3.

In this example, the utility score (or function) for the median is as follows:

$u(r,D)=-|$ number of elements in D larger than r-number of elements in D smaller than r$|$, wherein $||$ denotes the absolute value of $|x|$, and in this example, "r" can vary from "1" to "5" as part of the output domain $\mathcal{R}$. And, this utility score/function is decomposable to each party. For each output element $r \in \mathcal{R}$, each party may count their data elements which are larger or smaller than r, which are added together and subtracted as noted in the utility function for the median to compute the score over the combined data.

Each party $P_i$ 110A-C may provide, to the server 312, two input values (x, y) for each possible output $r \in \mathcal{R}$, where the first value x is the number of elements smaller than r and the second value y is the number of elements larger than r in their data set $D_i$.

The party $P_1$ 110A provides an input 302A to the server 312. This input corresponds to utility scores for each domain element with respect to its own data $D_1$ as follows:

$u(1,D_1)=(0,1)$, $u(2,D_1)=(2,0)$, $u(3,D_1)=(3,0)$, $u(4,D_1)=(3,0)$, $u(5,D_1)=(3,0)$.

The party $P_2$ 110B provides an input 302B to the server 312. This input corresponds to utility scores for each domain element with respect to its own data $D_2$ as follows:

$u(1,D_2)=(0,3)$, $u(2,D_2)=(0,2)$, $u(3,D_2)=(1,1)$, $u(4,D_2)=(2,0)$, $u(5,D_2)=(3,0)$.

The party $P_3$ 110N provides an input 302C to the server 312. This input corresponds to utility scores for each domain element with respect to its own data $D_3$ as follows:

$u(1,D_3)=(0,3)$, $u(2,D_3)=(0,3)$, $u(3,D_3)=(0,3)$, $u(4,D_3)=(0,2)$, $u(5,D_3)=(1,0)$.

As noted, the parties $P_1$, $P_2$, and $P_3$ 110A-C may also provide inputs that include partial noises for each of the utility scores, but as noted above noise is omitted from this example as well facilitate explanation.

When the utility score or a noisy utility score are received as input at 302A-C, the server 312 (or other type of computer-based processor) may determine and select a highest noisy utility score, wherein the output value having the highest noisy utility score is selected from a domain of output values. For example, the scores can be combined into a global noisy utility score s. For r=1-5, the server 312 may compute s as follows:

$$s = u(1, D)$$
$$= -\left|\sum_{i=1}^{3} 1st \text{ value in } u(1, D_i) - \sum_{i=1}^{3} 2nd \text{ value in } u(1, D_i)\right|$$
$$= -|(0+0+0) - (1+3+3)| = -|0-7| = -7.$$

For $r = 2 : s = -|(2+0+0) - (0+2+3)| = -3$.

For $r = 3 : s = -|(3+1+0) - (0+1+3)| = 0$.

For $r = 4 : s = -|(3+2+0) - (0+0+2)| = -3$.

For $r = 5 : s = -|(3+3+1) - (0+0+0)| = -7$.

In this example, the highest score m is 0, and the corresponding output element v with this highest score is r=3 (which in this example corresponds to the median). If noise is included, the output may be probabilistic and exponentially more likely to reflect the actual median than any other likely output values. In this example, the server 312 provides as the secure multi-party computation output 310 of "3" which in this example represents the median. Thus, the noisy utility score is used to select the output from the data domain (which in this example is the set of values $\{1,2,3,4,5\}$).

In the case of large output domains e.g., $\mathcal{R} = [1,1000\,000] = \{1,2,3,\ldots,1\,000\,000\}$, the domains may be split into subranges, e.g., [1,1000],[1001,2000], and so forth. When this is the case, the process noted herein to determine the noisy utility score may find the subrange that contains the median, e.g., [1, 1000], which can be split into smaller subranges, e.g., [1, 100], [101,200], etc., and run our process and repeat add need until the subrange contains only one element, the median.

Figure 4:
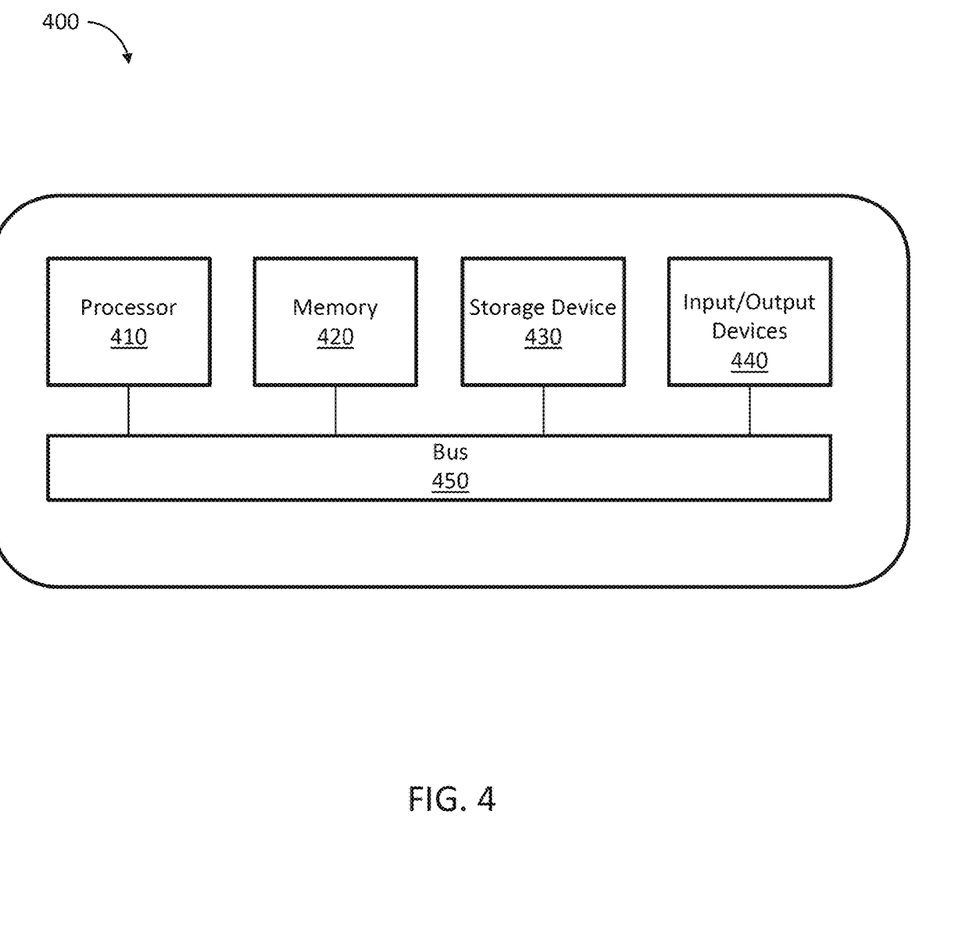
FIG. 4 depicts a block diagram illustrating a computing system consistent with implementations of the current subject matter.

FIG. 4 depicts a block diagram illustrating a computing system 400 consistent with implementations of the current subject matter. For example, the system 400 can be used to implement the client devices, the server, and/or the like.

As shown in FIG. 4, the computing system 400 can include a processor 410, a memory 420, a storage device 430, and input/output devices 440. According to implementations of the current subject matter, a trusted execution environment may be a secure area that may be contained in the processor 410, or it may be an additional hardware and/or software component. The trusted execution environment may run enclaves to guarantee confidentiality and integrity protection to code and data contained therein, even in an untrusted environment.

The processor 410, the memory 420, the storage device 430, and the input/output devices 440 can be interconnected via a system bus 450. The processor 410 is capable of processing instructions for execution within the computing system 400. Such executed instructions can implement one or more components of, for example, the trusted server, client devices (parties), and/or the like. In some implementations of the current subject matter, the processor 410 can be a single-threaded processor. Alternately, the processor 410 can be a multi-threaded processor. The process may be a multi-core processor have a plurality or processors or a single core processor. The processor 410 is capable of processing instructions stored in the memory 420 and/or on the storage device 430 to display graphical information for a user interface provided via the input/output device 440.

The memory 420 is a computer readable medium such as volatile or non-volatile that stores information within the computing system 400. The memory 420 can store data structures representing configuration object databases, for example. The storage device 430 is capable of providing persistent storage for the computing system 400. The storage device 430 can be a floppy disk device, a hard disk device, an optical disk device, or a tape device, or other suitable persistent storage means. The input/output device 440 provides input/output operations for the computing system 400. In some implementations of the current subject matter, the input/output device 440 includes a keyboard and/or pointing device. In various implementations, the input/output device 440 includes a display unit for displaying graphical user interfaces.

According to some implementations of the current subject matter, the input/output device 440 can provide input/output operations for a network device. For example, the input/output device 440 can include Ethernet ports or other networking ports to communicate with one or more wired and/or wireless networks (e.g., a local area network (LAN), a wide area network (WAN), the Internet).

In some implementations of the current subject matter, the computing system 400 can be used to execute various interactive computer software applications that can be used for organization, analysis and/or storage of data in various (e.g., tabular) format (e.g., Microsoft Excel®, and/or any other type of software). Alternatively, the computing system 400 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be stand-alone computing products and/or functionalities. Upon activation within the applications, the functionalities can be used to generate the user interface provided via the input/output device 440. The user interface can be generated and presented to a user by the computing system 400 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:
   at least one data processor; and
   at least one memory storing instructions which, when executed by the at least one data processor, result in operations comprising:
   receiving, from each of a plurality of clients, a utility score and a partial noise value, wherein a utility function, at each of the plurality of clients, determines the utility score, and wherein a higher utility score indicates that a selection probability of a corresponding data value is higher than another data value with a lower utility score;
   performing, based on the received utility scores and the partial noise values, a secure multi-party computation of a privacy-preserving statistic, the performing of the secure multi-party computation of the privacy-preserving statistic comprising determining a noisy utility score for each data value in a domain of data values and selecting a highest noisy utility score from the determined noisy utility scores, wherein selecting the highest noisy utility score from the determined noisy utility scores comprises:
   initializing a first variable to zero;
   for a first possible output value, determining a first noisy utility score for the first possible output value;
   in response to the first noisy utility score being greater than the first variable, setting the first variable equal to the first noisy utility score;
   for a second possible output value, determining a second noisy utility score for the second possible output value;
   in response to the second noisy utility score being greater than the first variable, selecting the second noisy utility score as the highest noisy utility score; and
   providing, based on the selected highest noisy utility score, the second possible output value from the domain of data values for the privacy-preserving statistic.

2. The system of claim 1, wherein the noisy utility score is determined by summing, for each data value in the domain of data values, the utility scores and the partial noise values.

3. The system of claim 1, wherein the utility function determines an interquartile range of the domain of data values.

4. The system of claim 1, wherein the partial noise values are determined based on a Gumbel distribution.

5. The system of claim 1, wherein the second possible output value is provided to each client of the plurality of clients while preserving differential privacy of each data value of each client of the plurality of clients.

6. A method comprising:
   receiving, from each of a plurality of clients, a utility score and a partial noise value, wherein a utility function, at each of the plurality of clients, determines the utility score, and wherein a higher utility score indicates that a selection probability of a corresponding data value is higher than another data value with a lower utility score;
   performing, based on the received utility scores and the partial noise values, a secure multi-party computation of a privacy-preserving statistic, the performing of the secure multi-party computation of the privacy-preserving statistic comprising determining a noisy utility score for each data value in a domain of data values and selecting a highest noisy utility score from the determined noisy utility scores, wherein selecting the highest noise utility score from the determined noisy utilities scores comprises:
   initializing a first variable to zero;
   for a first possible output value, determining a first noisy utility score for the first possible output value;
   in response to the first noisy utility score being greater than the first variable, setting the first variable equal to the first noisy utility score;
   for a second possible output value, determining a second noisy utility score for the second possible output value;
   in response to the second noisy utility score being greater than the first variable, selecting the second noisy utility score as the highest noisy utility score; and
   providing, based on the selected highest noisy utility score, the second possible output value from the domain of data values for the privacy-preserving statistic.

7. The method of claim 6, wherein the noisy utility score is determined by summing, for each data value in the domain of data values, the utility scores and the partial noise values.

8. The method of claim 6, wherein the utility function determines an interquartile range of the domain of data values.

9. The method of claim 6, wherein the partial noise values are determined based on a Gumbel distribution.

10. The method of claim 6, wherein the second possible output value is provided to each client of the plurality of clients while preserving differential privacy of each data value of each client of the plurality of clients.

11. A non-transitory computer-readable storage medium including instructions which, when executed by at least one data processor, result in operations comprising:

receiving, from each of a plurality of clients, a utility score and a partial noise value, wherein a utility function, at each of the plurality of clients, determines the utility score, and wherein a higher utility score indicates that a selection probability of a corresponding data value is higher than another data value with a lower utility score;

performing, based on the received utility scores and the partial noise values, a secure multi-party computation of a privacy-preserving statistic, the performing of the secure multi-party computation of the privacy-preserving statistic comprising determining a noisy utility score for each data value in a domain of data values and selecting a highest noisy utility score from the determined noisy utility scores, wherein selecting the highest noise utility score from the determined noisy utilities scores comprises:

initializing a first variable to zero;

for a first possible output value, determining a first noisy utility score for the first possible output value;

in response to the first noisy utility score being greater than the first variable, setting the first variable equal to the first noisy utility score;

for a second possible output value, determining a second noisy utility score for the second possible output value;

in response to the second noisy utility score being greater than the first variable, selecting the second noisy utility score as the highest noisy utility score; and providing, based on the selected highest noisy utility score, the second possible output value from the domain of data values for the privacy-preserving statistic.

12. The non-transitory computer-readable storage medium of claim 11, wherein the noisy utility score is determined by summing, for each data value in the domain of data values, the utility scores and the partial noise values.

13. The non-transitory computer-readable storage medium of claim 11, wherein the utility function is a sum of loss function.

14. The non-transitory computer-readable storage medium of claim 11, wherein the partial noise values are determined based on a Gumbel distribution.

15. The non-transitory computer-readable storage medium of claim 11, wherein the second possible output value is provided to each client of the plurality of clients while preserving differential privacy of each data value of each client of the plurality of clients.

* * * * *